US012206160B2

(12) United States Patent
Choi et al.

(10) Patent No.: US 12,206,160 B2
(45) Date of Patent: Jan. 21, 2025

(54) ANTENNA STACK STRUCTURE

(71) Applicant: DONGWOO FINE-CHEM CO., LTD., Jeollabuk-do (KR)

(72) Inventors: Byung Jin Choi, Incheon (KR); Han Sub Ryu, Gyeongsangbuk-do (KR); Jae Hyun Lee, Gyeonggi-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 132 days.

(21) Appl. No.: 18/098,800

(22) Filed: Jan. 19, 2023

(65) Prior Publication Data

US 2023/0163446 A1 May 25, 2023

Related U.S. Application Data

(63) Continuation of application No. PCT/KR2021/009257, filed on Jul. 19, 2021.

(30) Foreign Application Priority Data

Jul. 24, 2020 (KR) ........................ 10-2020-0092579

(51) Int. Cl.
*H01Q 1/24* (2006.01)
*H01Q 1/48* (2006.01)
*H01Q 9/04* (2006.01)

(52) U.S. Cl.
CPC ............... *H01Q 1/243* (2013.01); *H01Q 1/48* (2013.01); *H01Q 9/0407* (2013.01)

(58) Field of Classification Search
CPC ........ H01Q 1/241; H01Q 1/242; H01Q 1/243; H01Q 1/40; H01Q 1/48; H01Q 1/50; H01Q 9/0407; H01Q 21/08
See application file for complete search history.

(56) References Cited

U.S. PATENT DOCUMENTS

2013/0321212 A1 12/2013 O'Shea et al.

FOREIGN PATENT DOCUMENTS

| | | | |
|---|---|---|---|
| CN | 111063993 | A | 4/2020 |
| CN | 215869777 | U | 2/2022 |
| JP | 2018-142872 | A | 9/2018 |
| KR | 10-2013-0113222 | A | 10/2013 |
| KR | 10-2016-0080444 | A | 7/2016 |
| KR | 10-2019-0021837 | A | 3/2019 |
| KR | 10-2089458 | B1 | 3/2020 |
| KR | 10-2020-0043124 | A | 4/2020 |
| KR | 10-2020-0068904 | A | 6/2020 |
| KR | 10-2204404 | B1 | 1/2021 |

OTHER PUBLICATIONS

International Search Report for PCT/KR2021/009257 mailed on Oct. 25, 2021.

Office action issued on Sep. 15, 2020 from Korean Patent Office in a counterpart Korean Patent Application No. 10-2020-0092579 (all the cited references are listed in this IDS.) (English translation is also submitted herewith.).

*Primary Examiner* — Hoang V Nguyen
(74) *Attorney, Agent, or Firm* — The PL Law Group, PLLC

(57) ABSTRACT

An antenna stack structure according to an embodiment includes an antenna substrate layer, an antenna unit disposed on one surface of the antenna substrate layer and including a radiator and an antenna pad, and a pad ground and an insulating layer disposed at the same level on an opposite surface of the antenna substrate layer facing the one surface. The antenna pad is superimposed over the pad ground in a thickness direction. Radiation properties can be improved utilizing the antenna pad.

11 Claims, 7 Drawing Sheets

ANTENNA STACK STRUCTURE

CROSS-REFERENCE TO RELATED APPLICATION AND CLAIM OF PRIORITY

The present application is a continuation application to International Application No. PCT/KR2021/009257 with an International Filing Date of Jul. 19, 2021, which claims the benefit of Korean Patent Application No. 10-2020-0092579 filed on Jul. 24, 2020 at the Korean Intellectual Property Office, the disclosures of which are incorporated by reference herein in their entirety.

BACKGROUND

1. Field

The present invention relates to an antenna stack structure. More particularly, the present invention relates to an antenna stack structure including an antenna layer and a ground layer.

2. Description of the Related Art

As mobile communication technologies have been developed, an antenna for implementing a communication of high frequency or ultra-high frequency band is applied to a display device such as a smartphone, various objects or structures such as a vehicle, an architecture, etc.

An optical structure such as a polarizing plate and various sensor structures may be included in the display device. Accordingly, when the antenna is included in the display device, proper arrangement and construction of the antenna to avoid an interference between the optical structure and the sensor structure is needed.

Additionally, a space to which the antenna can be applied may be limited by the optical structure and the sensor structure. If an additional film or structure is formed for inserting the antenna, an overall thickness and volume of the display device may be increased.

Thus, an antenna construction to obtain sufficient radiation and gain properties of the antenna in a limited space is required.

For example, Korean Published Patent Application No. 10-2013-0113222 discloses an antenna structure embedded in a portable terminal, but does not sufficiently disclose an antenna design in consideration of both optical and radiation properties in the display device as described above.

SUMMARY

According to an aspect of the present invention, there is provided an antenna stack structure having improved radiation property.

(1) An antenna stack structure, including: an antenna substrate layer; an antenna unit disposed on one surface of the antenna substrate layer, the antenna unit including a radiator and an antenna pad; and a pad ground and an insulating layer disposed at the same level on an opposite surface of the antenna substrate layer facing the one surface, wherein the antenna pad is superimposed over the pad ground in a thickness direction.

(2) The antenna stack structure according to the above (1), wherein the antenna pad includes a signal pad electrically connected to the radiator, and a ground pad formed around the signal pad.

(3) The antenna stack structure according to the above (1), wherein the antenna stack structure has a radiation area and a pad area in which the antenna pad is located, and the pad ground is formed in the pad area.

(4) The antenna stack structure according to the above (1), further including a cover window disposed on the antenna unit.

(5) The antenna stack structure according to the above (1), further including a radiation ground disposed on a bottom surface of the insulating layer, wherein the radiator is superimposed over the radiation ground in a thickness direction.

(6) The antenna stack structure according to the above (5), wherein the pad ground and the radiation ground are electrically connected to each other.

(7) The antenna stack structure according to the above (6), wherein a thickness of the pad ground is greater than a thickness of the insulating layer, and the pad ground is in a lateral contact with the radiation ground.

(8) The antenna stack structure according to the above (5), further including a display panel disposed on the bottom surface of the insulating layer, and the display panel serves as the radiation ground.

(9) The antenna stack structure according to the above (8), wherein the display panel includes a display device including an electrode layer, and the electrode layer of the display device serves as the radiation ground, wherein the antenna substrate layer or the insulating layer serves as an encapsulation layer covering the display device.

(10) The antenna stack structure according to the above (1), wherein the pad ground is in contact with the antenna substrate layer.

(11) The antenna stack structure according to the above (1), wherein the radiator has a mesh structure.

(12) The antenna stack structure according to the above (11), wherein the antenna unit further includes a dummy mesh pattern arranged around the radiator.

An antenna stack structure according to embodiments of the present invention may include a pad ground overlapping an antenna pad in a thickness direction. A resonance frequency matching and an impedance optimizing may be implemented using the antenna pad, so that a gain and a radiation property at a specific frequency may be improved. Further, the antenna pad and the pad ground may be adjacent to each other to further improve an antenna gain.

In some embodiments, an electrode layer of a display panel may serve as a radiation ground, and the antenna stack structure integrated with the display panel may be provided.

DETAILED DESCRIPTION OF THE EMBODIMENTS

According to exemplary embodiments of the present invention, there is provided an antenna stack structure in which a pad of an antenna unit and a pad ground may overlap each other in a thickness direction.

The antenna stack structure may include, e.g., a microstrip patch antenna fabricated in the form of a transparent film. The antenna stack structure may be applied to communication devices for a mobile communication of a high or ultrahigh frequency band corresponding to a mobile communication of, e.g., 3G, 4G, 5G or more, Wi-fi, Bluetooth, NFC, GPS, etc.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
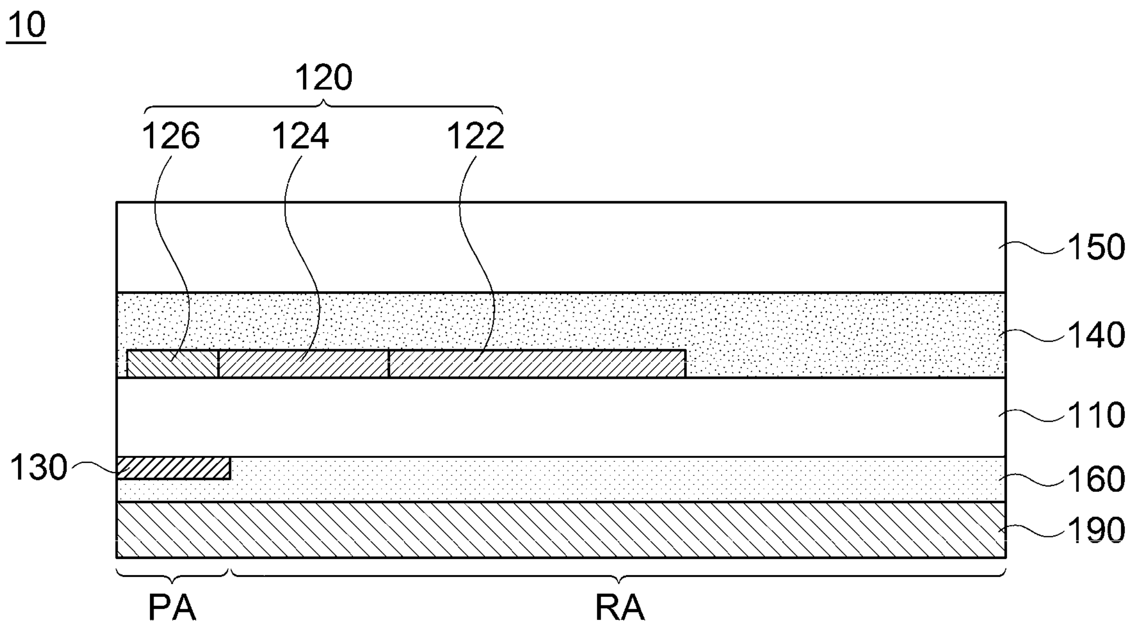
FIG. 1 is a schematic cross-sectional view illustrating an antenna stack structure in accordance with exemplary embodiments.
Figure 2:
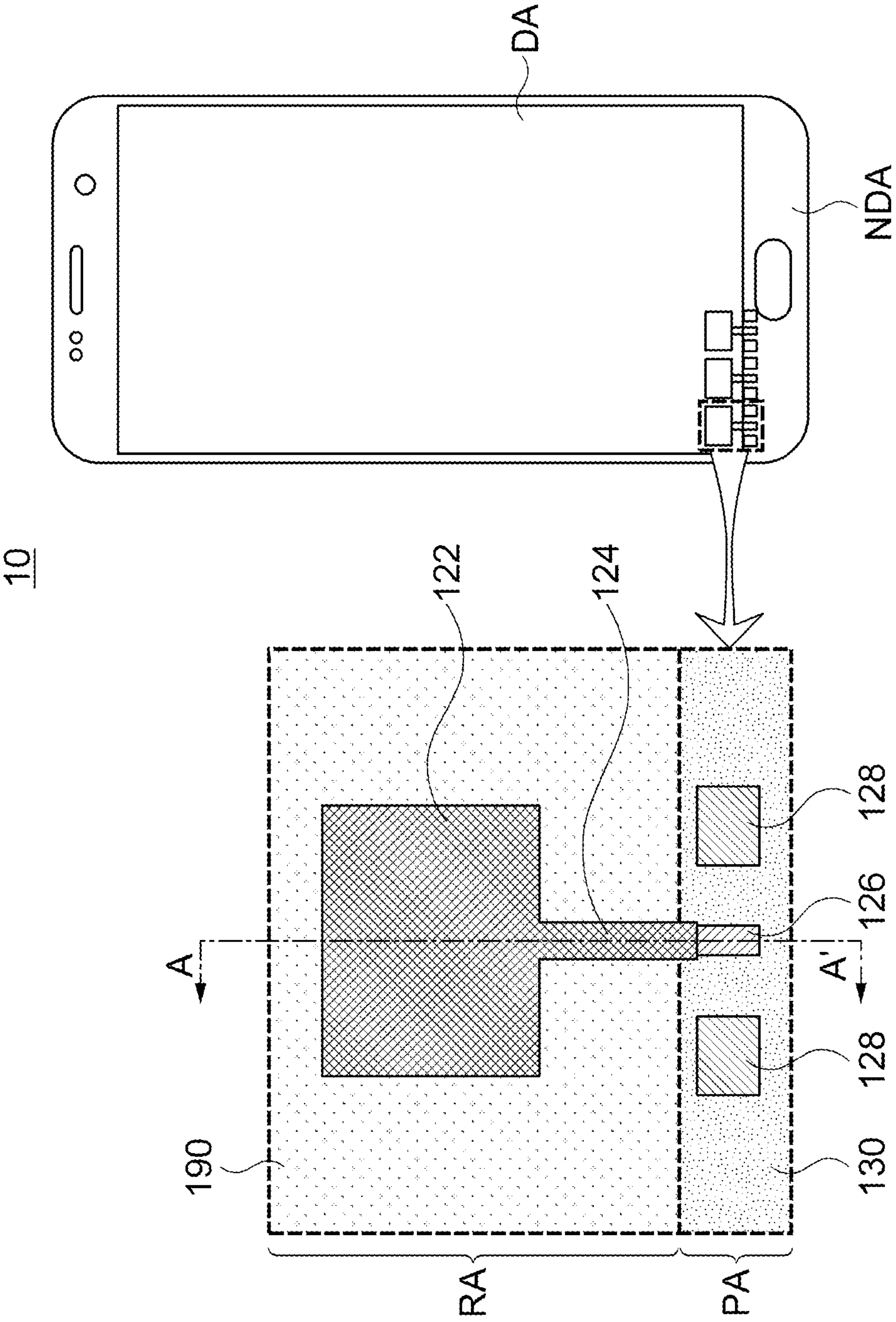
FIG. 2 is a schematic top planar view illustrating a stacked construction of an antenna unit and a ground layer in accordance with exemplary embodiments.

FIG. 1 is a schematic cross-sectional view illustrating an antenna stack structure in accordance with exemplary embodiments. FIG. 2 is a schematic top planar view illustrating a stacked construction of an antenna unit and a ground layer in accordance with exemplary embodiments. For example, FIG. 1 is a cross-sectional view taken along a line A-A' of FIG. 2. For convenience of descriptions, illustration of an antenna substrate layer 110 and a lower insulating layer 160 interposed between an antenna unit 120 and a pad ground 130, and between the antenna unit 120 and a radiation ground 190 is omitted in FIG. 2. FIG. 2 illustrates only one antenna unit, but a plurality of the antenna units may be arranged on the antenna substrate layer 110 in an array form.

Referring to FIG. 1, an antenna stack structure 10 may include the antenna substrate layer 110, the antenna unit 120, the pad ground 130 and the lower insulating layer 160. The antenna stack structure 10 may further include an upper insulating layer 140, a cover window 150 and/or the radiation ground 190.

The antenna substrate layer 110 may be disposed between the antenna unit 120 and at least one of the pad ground 130 and the radiation ground 190 to serve as a dielectric layer of an antenna.

The antenna substrate layer 110 may include, e.g., a transparent resin material. For example, the antenna substrate layer 110 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more thereof.

In some embodiments, an adhesive film such as an optically clear adhesive (OCA) or an optically clear resin (OCR) may be included in the antenna substrate layer 110.

In some embodiments, the antenna substrate layer 110 may include an inorganic insulating material such as silicon oxide, silicon nitride, silicon oxynitride, glass, or the like.

In some embodiments, the antenna substrate layer 110 may be provided as a substantially single layer. In some embodiments, the antenna substrate layer 110 may include a multilayer structure including at least two or more layers.

A capacitance or an inductance may be formed between the antenna unit 120, and the pad ground 130 and/or the radiation ground 190 by the antenna substrate layer 110, so that a frequency band at which the antenna stack structure 10 may be operated may be adjusted.

In some embodiments, a dielectric constant of the antenna substrate layer 110 may be adjusted in a range from about 1.5 to about 12. When the dielectric constant exceeds about 12, a driving frequency may be excessively decreased, so that driving in a desired high or ultra-high frequency band may not be implemented. For example, if the antenna substrate layer 110 includes glass, the antenna substrate layer 110 may have a dielectric constant from 3.5 to 8.

In exemplary embodiments, a thickness of the antenna substrate layer 110 may be from 5 μm to 200 μm. Within this range, gain and efficiency of the antenna may be increased.

The antenna unit 120 may be disposed on one surface (e.g., a top surface) of the antenna substrate layer 110. For example, the antenna unit 120 may be directly formed on the top surface of the antenna substrate layer 110.

The antenna unit 120 may include a radiator 122, a transmission line 124, and/or an antenna pad.

For example, the antenna unit 120 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination thereof.

For example, the antenna unit 120 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna unit 120 may include a transparent conductive oxide such as indium tin oxide (ITO), indium zinc oxide (IZO), tin oxide (SnOx), zinc oxide (ZnOx), indium zinc tin oxide (IZTO), etc.

In some embodiments, the antenna unit 120 may include a stacked structure of a transparent conductive oxide layer and a metal layer. For example, the antenna unit 120 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

In some embodiments, a thickness of the antenna unit 120 may be about 5,000 Å or less, preferably from about 1,000

Å to 5,000 Å. Within this range, a color shift phenomenon from a viewing surface of the antenna stack structure may be suppressed while preventing an increase in resistance of the antenna unit 120.

The radiator 122 may have, e.g., a polygonal plate shape, and the transmission line 124 may extend from one side of the radiator 122 to be electrically connected to the signal pad 126. The transmission line 124 may be formed as a single member substantially integral with the radiator 122.

In some embodiments, the antenna pad may include a signal pad 126 and may further include a ground pad 128. For example, a pair of the ground pads 128 may be disposed with the signal pad 126 interposed therebetween. The ground pads 128 may be electrically separated from the signal pad 126 and the transmission line 124.

In an embodiment, the ground pad 128 may be omitted. The signal pad 126 may be formed as an integral member at an end portion of the transmission line 124.

In some embodiments, an end portion of the antenna unit 120 may be electrically connected to a circuit connection structure. The circuit connection structure may include, e.g., a flexible printed circuit board (FPCB).

The antenna pad may be electrically connected to an antenna driving integrated circuit (IC) chip through the circuit connection structure such as the flexible printed circuit board. Accordingly, a feeding and a driving control to the antenna unit may be performed by the antenna driving IC chip.

The driving IC chip may be directly disposed on the flexible circuit board. For example, the flexible circuit board (FPCB) may further include a circuit or a contact electrically connecting the driving IC chip and the antenna unit. The flexible circuit board (FPCB) and the driving IC chip may be disposed to be adjacent to each other, a signal transmission/reception path may be shortened and a signal loss may be suppressed.

In an embodiment, the antenna unit 120 may be formed as a mesh structure. For example, the antenna unit 120 may be directly formed on the top surface of the antenna substrate layer 110 by a sputtering process.

In exemplary embodiments, the radiator 122 may have a mesh structure. In some embodiments, the transmission line 124 connected to the radiator 122 may also have a mesh structure.

The radiator 122 may include the mesh structure, so that transmittance may be improved even when the radiator 122 is disposed in a display area of a display device, thereby preventing electrodes from being visually recognized and preventing an image quality from being deteriorated.

A dummy mesh pattern may be disposed around the radiator 122 and the transmission line 124. The dummy mesh pattern may be electrically and physically spaced apart from the radiator 122 and the transmission line 124 by a separation region.

For example, a conductive layer including the above-described metal or alloy may be formed on the antenna substrate layer 110. The conductive layer may be partially etched along a profile of the radiator 122 and the transmission line 124 to form a separation region while forming the mesh structure. Accordingly, the antenna unit 120 and the dummy mesh pattern isolated by the separation region may be formed on the antenna substrate layer 110.

In some embodiments, the signal pad 126 may be formed as a solid structure to reduce a feeding resistance. For example, the signal pad 126 may be disposed in a non-display area or a light-shielding area of the display device to be bonded or connected to a flexible circuit board and/or an antenna driving IC chip.

Accordingly, the signal pad 126 may be disposed at an outside of a user's viewing area. In an embodiment, the signal pad 126 may substantially consist of a metal or alloy.

The pad ground 130 may be disposed on an opposite surface (e.g., a bottom surface) of the antenna substrate layer 110. The pad ground 130 may be formed on an opposite side of the antenna unit 120 with respect to the antenna substrate layer 110. The antenna pad may be superimposed over the pad ground 130 in a thickness direction of the antenna stack structure 10. In this case, a resonance frequency and an impedance may be adjusted using the antenna pad. Accordingly, an antenna gain and a radiation property may be improved.

In exemplary embodiments, the pad ground 130 may contact the surface of the antenna substrate layer 110. For example, the pad ground 130 may be formed directly on the surface (e.g., the bottom surface) of the antenna substrate layer 110. In this case, a distance between the pad ground 130 and the antenna pad of the antenna unit 120 may be reduced. Accordingly, the antenna gain may be further improved and the impedance may be effectively matched.

In exemplary embodiments, the antenna stack structure 10 may include a pad area PA where the antenna pad is located and a radiation area RA except for the pad area PA. The radiator 122 may be formed in the radiation area RA. In some embodiments, the pad ground 130 may be formed only in the pad area PA and may not extend to the radiation area RA.

For example, the pad ground 130 may include a conductive layer. The conductive layer may include a metal or a conductive metal compound. Preferably, the pad ground 130 may be formed of a low-resistance metal so that the frequency and the impedance may be effectively adjusted and matched.

For example, silver (Ag), gold (Au), copper (Cu), aluminum (Al), platinum (Pt), palladium (Pd), chromium (Cr), Titanium (Ti), tungsten (W), niobium (Nb), tantalum (Ta), vanadium (V), iron (Fe), manganese (Mn), cobalt (Co), nickel (Ni), zinc (Zn), molybdenum (Mo), tin (Sn), calcium (Ca), or an alloy thereof may be used without a consideration of transparency. Preferably, the low-resistance metal may include copper, aluminum, a silver-palladium-copper alloy, and/or a copper-calcium alloy.

In exemplary embodiments, a thickness of the pad ground 130 may be from 100 nm to 25 μm. For example, if the pad ground 130 is formed in the pad area PA of the antenna substrate layer 110 by a metal deposition process (e.g., a sputtering process), the thickness of the pad ground 130 may be from 100 nm to 1 μm. For example, if the pad ground 130 is formed by a mechanical method such as a metal printing or coating, the thickness of the pad ground 130 may be from 5 μm to 25 μm.

In exemplary embodiments, the pad ground 130 may be electrically connected to the ground pad 128 of the antenna unit 120. For example, the pad ground 130 and the ground pad 128 of the antenna unit 120 may be connected through a via or a contact penetrating the antenna substrate layer 110.

In some embodiments, the pad ground 130 may be electrically connected to the ground pad 128 of the antenna unit 120 through a ground wire bypassing a side surface of the antenna substrate layer 110. In this case, the antenna gain may be improved.

The lower insulating layer 160 may be formed at the same layer or at the same level as that of the pad ground 130. For example, the lower insulating layer 160 may be in contact with the bottom surface of the antenna substrate layer 110. In some embodiments, the lower insulating layer 160 may cover the bottom surface of the pad ground 130 or surfaces of the pad ground which are not in contact with the antenna substrate layer 110.

In exemplary embodiments, the lower insulating layer 160 may include at least one of an organic insulating layer and an inorganic insulating layer.

The organic insulating layer may include polyacrylate, polymethacrylate (e.g., PMMA), polyimide, polyamide, polyvinyl alcohol, polyamic acid, polyolefin (e.g., PE, PP), polystyrene, polynorbornene, phenylmaleimide copolymer, polyazobenzene, polyphenylenephthalamide, polyester (e.g., PET, PBT), polyarylate, a cinnamate-based polymer, a coumarin-based polymer, a phthalimidine-based polymer, a chalcone-based polymer, an aromatic acetylene-based polymer, etc. These may be used alone or in a combination thereof.

For example, the organic insulating layer may be formed by coating and drying a composition including the above-mentioned polymer material. A thickness of the organic insulating layer may be from about 1 μm to 5 μm, preferably from about 1.5 μm to 2.5 μm.

The inorganic insulating layer may include a single layer or a multi-layered structure, and may be formed of a metal oxide or a metal nitride. For example, the inorganic insulating layer may include at least one of SiNx, SiON, $Al_2O_3$, $SiO_2$ and $TiO_2$.

For example, the inorganic insulating layer may be formed as a SiON layer or a $SiO_2$ layer, or a bilayer of SiON and $SiO_2$ layers.

For example, the inorganic insulating layer may be formed by a deposition process such as chemical vapor deposition (CVD) process. The inorganic insulating layer may have a thickness from about 100 nm to 1,000 nm, preferably about 200 nm to 400 nm.

In exemplary embodiments, the lower insulating layer 160 may further include an adhesive layer such as an optically clear adhesive (OCA) layer, an optically clear resin (OCR) layer, or the like. For example, the radiation ground 190 may be attached to the organic/inorganic insulating layer or the antenna substrate layer 110 using the adhesive layer.

In exemplary embodiments, a thickness of the adhesive layer may be from about 25 μm to 300 μm.

Figure 3:
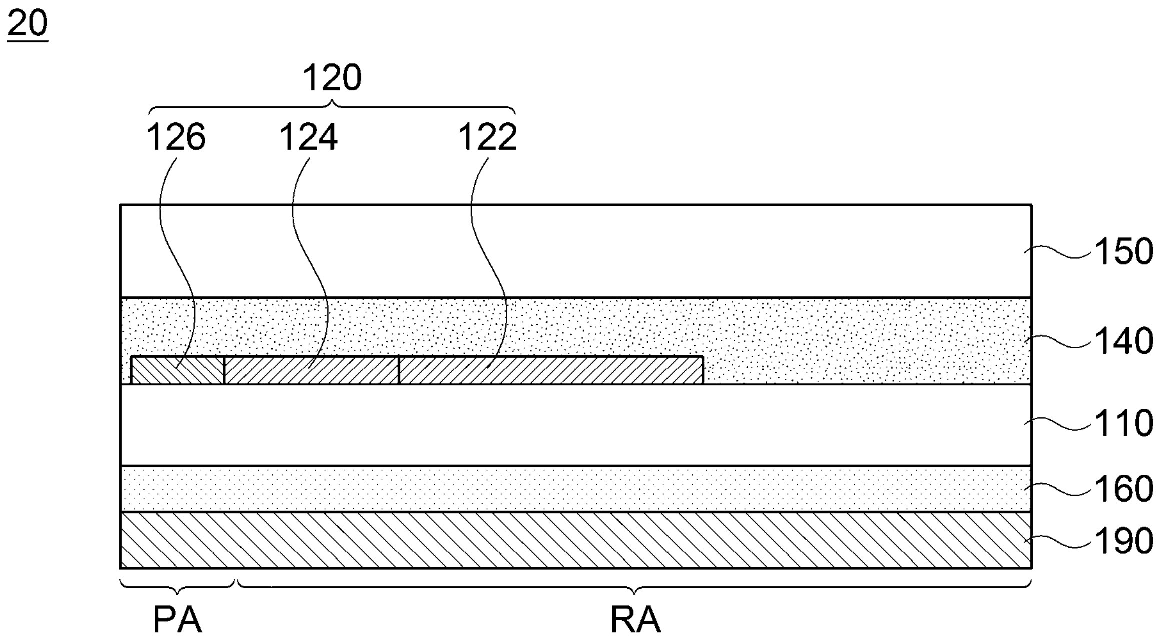
FIG. 3 is a schematic cross-sectional view illustrating an antenna stack structure in accordance with a comparative example.

FIG. 3 is a schematic cross-sectional view illustrating an antenna stack structure in accordance with a comparative example. Detailed descriptions on elements and structures substantially the same as or similar to those described with reference to FIG. 1 are omitted.

Referring to FIG. 3, an antenna stack structure 20 of a comparative example may not include the pad ground 130 disposed on the bottom surface of the antenna substrate layer 110, but may include the radiation ground 190 disposed on the bottom surface of the lower insulating layer 160.

In this case, a distance between the antenna unit 120 and the radiation ground 190 may be increased by a thickness of the lower insulating layer 160. In this case, the antenna gain may be decreased, and the impedance may not be effectively adjusted.

For example, if the display panel 200 serves as the radiation ground 190, the display panel 200 may be attached to the antenna stack structure via the lower insulating layer 160 including the adhesive layer, and a distance between the antenna unit 120 and the display panel 200 may be increased.

However, according to exemplary embodiments, even though the display panel 200 is attached to the antenna stack structure by the lower insulating layer 160 serving as the adhesive layer, the pad ground 130 may be formed on the bottom surface of the antenna substrate layer 110. Thus, a distance from the pad ground 130 to the antenna unit 120 and the antenna pad may be decreased. Accordingly, the antenna gain and impedance matching may be enhanced.

In exemplary embodiments, the radiation ground 190 may be disposed on a surface (e.g., a bottom surface) of the lower insulating layer 160 opposite to the antenna substrate layer 110. For example, the radiation ground 190 may be disposed under the pad ground 130. In this case, the pad ground 130 and the radiation ground 190 may be electrically and physically separated.

The radiator 122 of the antenna unit 120 may be superimposed over the radiation ground 190 in the thickness direction of the antenna stack structure 10. In this case, the radiator 122 and the entire antenna pad may be utilized to adjust the resonance frequency and impedance of the antenna.

In an embodiment, the radiation ground 190 may be formed only in the radiation area RA and may not overlap the antenna pad. In an embodiment, the radiation ground 190 may entirely cover the antenna unit 120 in a planar view.

In exemplary embodiments, the upper insulating layer 140 may be disposed on the antenna unit 120. The upper insulating layer 140 may cover the top surface of the antenna unit 120. The upper insulating layer 140 may include at least one of an organic insulating layer and an inorganic insulating layer substantially the same as those used for the lower insulating layer 160.

In some embodiments, the upper insulating layer 140 may further include an upper adhesive layer including a pressure-sensitive adhesive (PSA) or an optically transparent adhesive (OCA) that may include an acrylic resin, a silicone-based resin, an epoxy-based resin, etc. can The upper adhesive layer may attach the cover window 150 to the antenna unit 120 or the organic/inorganic insulating layer. In some embodiments, the upper adhesive layer may be omitted, and the organic/inorganic insulating layer may be directly attached to the cover window 150.

The cover window 150 may be disposed on the antenna unit 120. The cover window 150 may be disposed on an opposite side from the antenna substrate layer 110. The cover window 150 may be disposed on a viewing surface or an outermost surface of the antenna stack structure 10.

The cover window 150 may include, e.g., glass or a flexible resin material such as polyimide, polyethylene terephthalate (PET), an acrylic resin, a siloxane-based resin, etc.

In some embodiments, a thickness of the cover window 150 may be from about 10 μm to 100 μm. Preferably, the thickness of the cover window 150 may be from about 30 μm to 60 μm.

Figure 4:
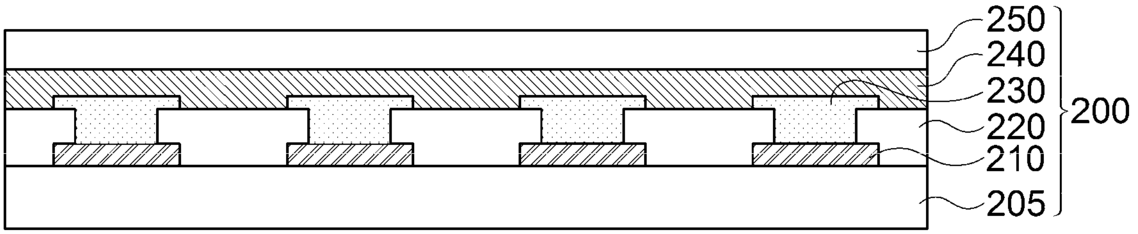
FIG. 4 is a schematic cross-sectional view illustrating a display panel in accordance with exemplary embodiments.

FIG. 4 is a schematic cross-sectional view illustrating a display panel in accordance with exemplary embodiments.

Referring to FIG. 4, the display panel 200 may include a panel substrate 205, a display device and an encapsulation layer 250 covering the display device. The display device may include an electrode layer, a pixel defining layer 220 and a display layer 230. The electrode layer may include a pixel electrode 210 and an opposing electrode 240.

The display device and the encapsulation layer 250 may be sequentially formed on the panel substrate 205.

A pixel circuit including a thin film transistor (TFT) may be formed on the panel substrate 205, and an insulating layer covering the pixel circuit may be formed. The pixel electrode 210 may be electrically connected to, e.g., a drain electrode of the TFT on the insulating layer.

The pixel defining layer 220 may be formed on the insulating layer to expose the pixel electrode 210 to define a pixel area. The display layer 230 may be formed on the pixel electrode 210, and the display layer 230 may include, e.g., a liquid crystal layer or an organic light emitting layer. Preferably, the display layer 230 may include the organic light emitting layer, and the display panel 200 may be an OLED panel.

The opposing electrode 240 may be disposed on the pixel defining layer 220 and the display layer 230. The opposite electrode 240 may serve as, e.g., a common electrode or a cathode of the display panel 200. The encapsulation layer 250 for protecting the display panel 200 may be stacked on the opposing electrode 240.

In exemplary embodiments, the display panel 200 may serve as the radiation ground 190. For example, the electrode layer (the pixel electrode 210 or the opposing electrode 240) of the display panel 200 may serve as the radiation ground 190. Preferably, the opposing electrode 240 having a relatively large area may be provided as the radiation ground 190.

In exemplary embodiments, the encapsulation layer 250 may serve as the antenna substrate layer 110 or the lower insulating layer 160. In this case, the display panel 200 and the antenna stack structure 10 may be integrated to provide a thin film structure.

In exemplary embodiments, a polarizing layer may be disposed between the antenna unit 120 and the window cover 150. For example, the polarizing layer may be formed on a top surface of the antenna substrate layer 110.

The polarizing layer may include a coated polarizer or a polarizing plate. The coating-type polarizer may include a liquid crystal coating layer including a polymerizable liquid crystal compound and a dichroic dye. In this case, the polarizing layer may further include an alignment layer for providing an alignment to the liquid crystal coating layer.

For example, the polarizing plate may include a polyvinyl alcohol-based polarizer and a protective film attached to at least one surface of the polyvinyl alcohol-based polarizer.

The upper insulating layer 140 may be disposed between the polarizing layer and the antenna unit 120. For example, the upper insulating layer 140 may be formed on the surface of the antenna unit 120 or the polarization layer, and then the antenna unit 120 and the polarizing layer may be attached to each other.

In example embodiments, the antenna stack structure may further include a touch sensing structure.

The touch sensing structure may include, e.g., capacitive sensing electrodes. For example, column direction sensing electrodes and row direction sensing electrodes may be arranged to cross each other. The touch sensing structure may further include traces connecting the sensing electrodes and a driving IC chip with each other. The touch sensing structure may further include a substrate on which the sensing electrodes and the traces are formed.

Figure 5:
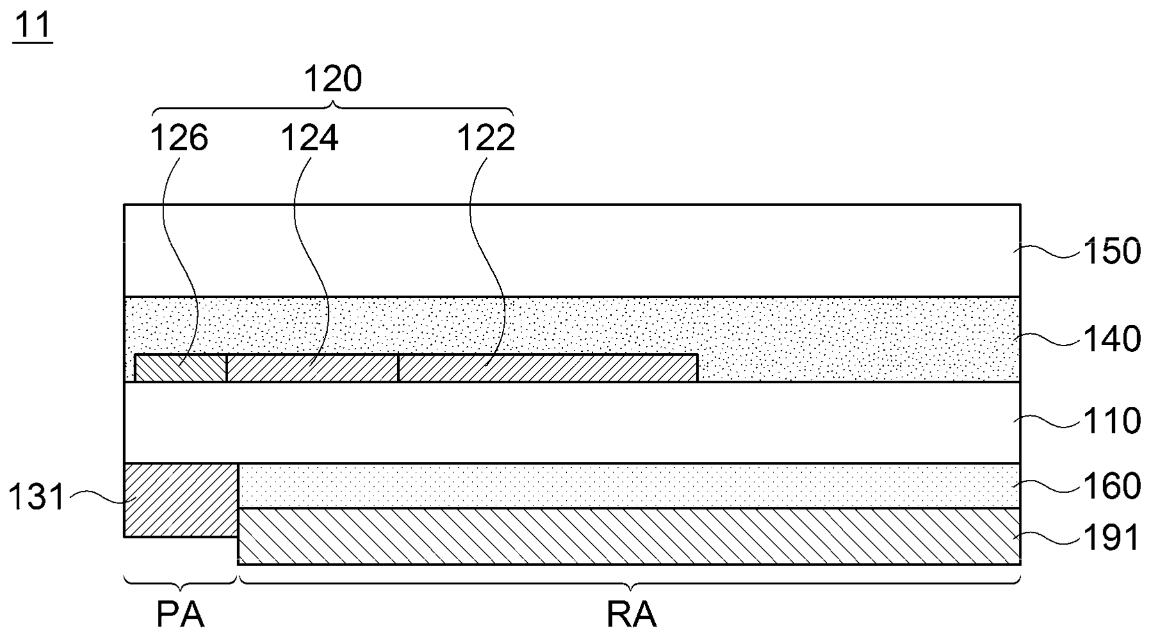
FIG. 5 is a schematic cross-sectional view illustrating an antenna stack structure in accordance with exemplary embodiments.

FIG. 5 is a schematic cross-sectional view illustrating an antenna stack structure in accordance with exemplary embodiments. Detailed descriptions on elements and structures substantially the same as those described with reference to FIG. 1 may be omitted.

Referring to FIG. 5, a pad ground 131 of an antenna stack structure 11 may be thicker than a lower insulating layer 160. In this case, the pad ground 131 may protrude from one surface of the lower insulating layer 160.

In some embodiments, a radiation ground 191 and the pad ground 131 may be electrically connected to each other. For example, the radiation ground 191 may contact the pad ground 131. In this case, the pad ground 131 and the radiation ground 191 may have improved electromagnetic capacity while forming a ground combined structure. Accordingly, an antenna gain may be improved and an impedance matching may be effectively implemented.

In some embodiments, when the display panel 200 serves as the radiation ground 191, the opposing electrode 240 of the display panel 200 may be connected to the pad ground 131.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

The radiator 122, the transmission line 124, the signal pad 126 and the ground pad 128 as illustrated in in FIG. 2 were formed using a Cu—Ca alloy on a COP dielectric layer having a thickness of 40 μm. The radiator 122 and the transmission line 124 were formed of a mesh pattern, and the signal pad 126 and the ground pad 128 were formed as a solid pattern.

An APC alloy was deposited by a sputtering process in the pad area PA on a bottom surface of the dielectric layer to form a pad ground having a thickness of about 300 nm. Specifically, the pad ground was formed to cover an entire area of each of the signal pad 126 and the ground pad 128 in a planar view.

A transparent adhesive layer having a thickness of 100 μm was formed to cover the bottom surface of the dielectric layer and the pad ground, and then was attached to an OLED display panel including a metal opposing electrode to prepare an antenna stack structure.

Example 2

The pad ground was formed by printing a silver paste to have a thickness of 10 μm instead of depositing the APC alloy from Example 1.

A transparent adhesive layer having a thickness of about 100 μm on a portion of the bottom surface of the dielectric layer where the pad ground was not formed. The OLED panel was attached to a bottom surface of the transparent adhesive layer.

COMPARATIVE EXAMPLE

An antenna stack structure was fabricated by omitting the pad ground from Example 1

Experimental Example 1: Analysis of Radiation Property

Figure 6:
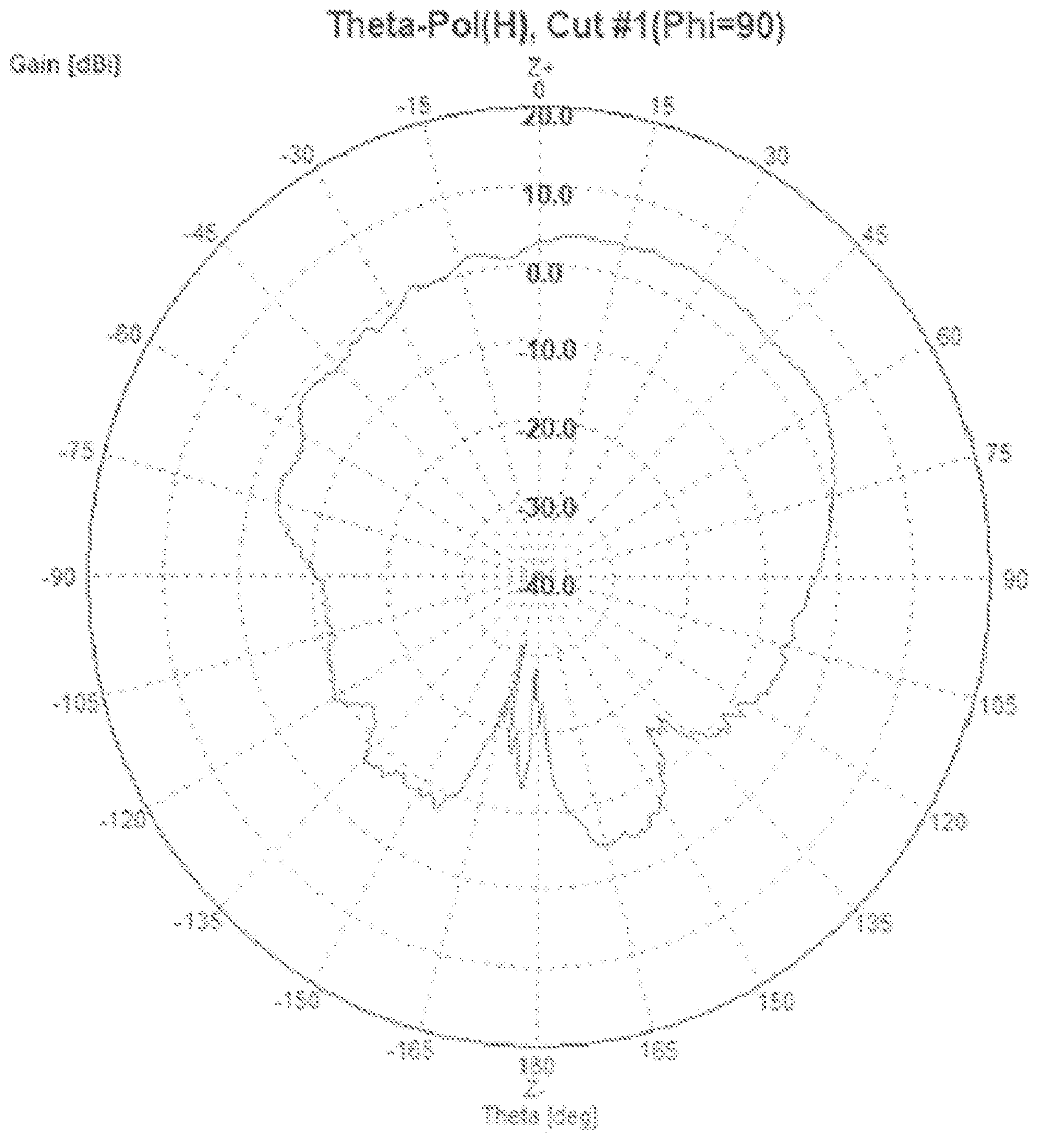
FIGS. 6 and 7 are radiation diagrams showing radiation profiles of antenna stack structure of Example 1 and Comparative Example.
Figure 7:
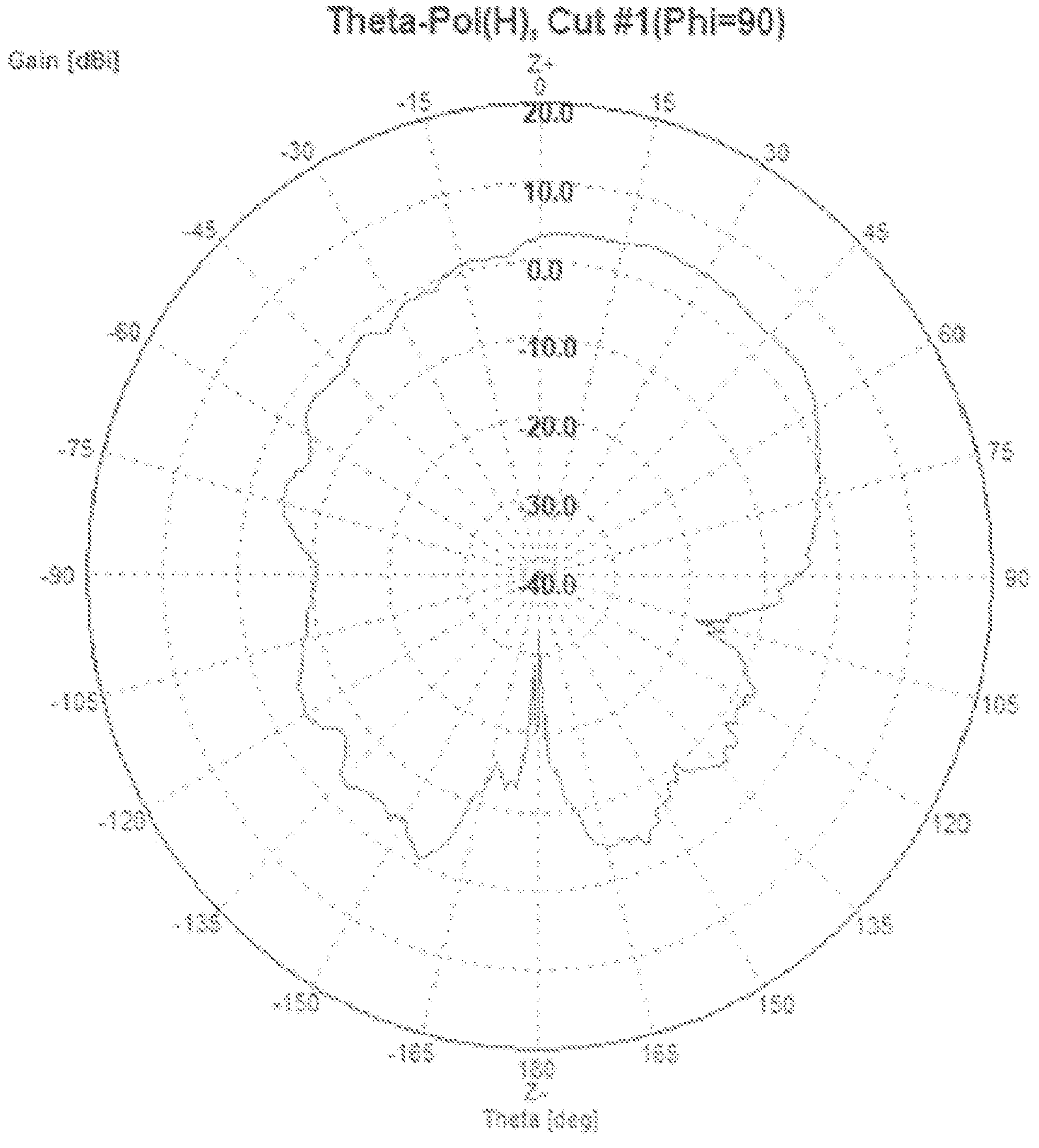

Radiation profiles of the antenna stack structures of Example 1 and Comparative Example were analyzed to obtain diagrams of FIGS. 6 and 7, respectively.

Referring to FIGS. 6 and 7, the antenna stack structure of Example 1 provided the radiation profile more circular than that of Comparative Example to show a relatively uniform radiation property with respect to a directivity angle.

Experimental Example 2: Evaluation of Antenna Gain

Gains (dBi) of the antenna stack structures of Examples and Comparative Examples were analyzed within a 26 to 30 GHz range. The results are shown in Table 1 below.

TABLE 1

| | Frequency (GHz) | | | | | | | | |
|---|---|---|---|---|---|---|---|---|---|
| | 26.0 | 26.5 | 27.0 | 27.5 | 28.0 | 28.5 | 29.0 | 29.5 | 30.0 |
| Example 1 | 3.16 | 4.57 | 5.08 | 5.39 | 4.22 | 3.51 | 2.88 | 2.47 | 2.07 |
| Example 2 | 3.64 | 4.91 | 5.49 | 5.80 | 4.81 | 3.97 | 3.24 | 2.89 | 2.47 |
| Comparative Example | −3.45 | −5.28 | −5.68 | −3.4 | 0.91 | 3.07 | 4.24 | 3.65 | 3.06 |

Referring to Table 1, the antenna stack structure of the Examples provided remarkably improved antenna gains around the frequency of 28.0 GHz compared to that of Comparative Example. Further, the antenna stack structure of the Examples showed a broadband antenna radiation having improved antenna gain in the frequency range from 26 GHz to 30 GHz.

What is claimed is:

1. An antenna stack structure, comprising:

an antenna substrate layer including a pad area and a radiation area;

an antenna unit disposed on one surface of the antenna substrate layer, the antenna unit comprising a radiator disposed in the radiation area and an antenna pad connected to the radiator and disposed in the pad area; and a pad ground and an insulating layer disposed at the same level on an opposite surface of the antenna substrate layer facing the one surface, wherein the antenna pad is superimposed over the pad ground in a thickness direction, and the radiator is not superimposed over the pad ground in the thickness direction.

2. The antenna stack structure according to claim 1, wherein the antenna pad comprises a signal pad electrically connected to the radiator, and a ground pad formed around the signal pad.

3. The antenna stack structure according to claim 1, further comprising a cover window disposed on the antenna unit.

4. The antenna stack structure according to claim 1, further comprising a radiation ground disposed on a bottom surface of the insulating layer, wherein the radiator is superimposed over the radiation ground in a thickness direction.

5. The antenna stack structure according to claim 4, wherein the pad ground and the radiation ground are electrically connected to each other.

6. The antenna stack structure according to claim 5, wherein a thickness of the pad ground is greater than a thickness of the insulating layer, and the pad ground is in a lateral contact with the radiation ground.

7. The antenna stack structure according to claim 4, further comprising a display panel disposed on the bottom surface of the insulating layer, and the display panel serves as the radiation ground.

8. The antenna stack structure according to claim 7, wherein the display panel comprises a display device including an electrode layer, and the electrode layer of the display device serves as the radiation ground, wherein the antenna substrate layer or the insulating layer serves as an encapsulation layer covering the display device.

9. The antenna stack structure according to claim 1, wherein the pad ground is in contact with the antenna substrate layer.

10. The antenna stack structure according to claim 1, wherein the radiator has a mesh structure.

11. The antenna stack structure according to claim 10, wherein the antenna unit further comprises a dummy mesh pattern arranged around the radiator.

* * * * *